US010696278B2

(12) United States Patent
Belanger

(10) Patent No.: US 10,696,278 B2
(45) Date of Patent: Jun. 30, 2020

(54) LIGHTED VEHICLE WASH DRYER ASSEMBLY CONTROL SYSTEM

(71) Applicant: WashMe Properties, LLC, Northville, MI (US)

(72) Inventor: Michael J. Belanger, Northville, MI (US)

(73) Assignee: PISTON OPW, INC., Hamilton, OH (US)

( * ) Notice: Subject to any disclaimer, the term of this patent is extended or adjusted under 35 U.S.C. 154(b) by 139 days.

(21) Appl. No.: 15/067,693

(22) Filed: Mar. 11, 2016

(65) Prior Publication Data

US 2016/0264104 A1    Sep. 15, 2016

Related U.S. Application Data

(63) Continuation-in-part of application No. 14/695,773, filed on Apr. 24, 2015, now Pat. No. 10,266,156, and a continuation-in-part of application No. 14/687,704, filed on Apr. 15, 2015, now Pat. No. 10,155,503.

(60) Provisional application No. 62/208,924, filed on Aug. 24, 2015, provisional application No. 62/045,208, filed on Sep. 3, 2014.

(51) Int. Cl.
*B60S 3/00* (2006.01)
*B60S 3/04* (2006.01)
*G06Q 30/06* (2012.01)

(52) U.S. Cl.
CPC ............... *B60S 3/04* (2013.01); *B60S 3/002* (2013.01); *G06Q 30/0641* (2013.01)

(58) Field of Classification Search
CPC .. B60S 3/00; B60S 3/002; B60S 3/004; B60S 3/04; B60S 3/041; B60S 3/06; B60S 3/063; B60S 3/066
See application file for complete search history.

(56) References Cited

U.S. PATENT DOCUMENTS 4,979,316 A * 12/1990 Belanger ................. B60S 3/002
15/316.1
6,372,053 B1 * 4/2002 Belanger ................... B60S 3/04
134/123

(Continued)

FOREIGN PATENT DOCUMENTS

DE         19950596 A1     5/2001

OTHER PUBLICATIONS

Australian Examination Report No. 1 for Standard Patent Application dated Jun. 21, 2018 and Australian Examination Report No. 1 for Standard Patent Application dated Jul. 19, 2018.

*Primary Examiner* — David G Cormier
(74) *Attorney, Agent, or Firm* — Dickinson Wright PLLC

(57) ABSTRACT

A vehicle wash system having an entrance end, an exit end, and a vehicle treatment area. The system including a dryer element disposed on a frame adjacent the exit end. The dryer element includes an air inlet, a plurality of air outlets, and a housing constructed of a translucent material. The dryer element includes light source disposed in the housing and configured to emit light in a plurality of different colors. The light source has a plurality of modes each corresponding to a different system condition. The system also includes a controller in communication with the light source and configured to enable the plurality of modes in response to a detected system condition.

20 Claims, 13 Drawing Sheets

(56) References Cited

U.S. PATENT DOCUMENTS

| | | | |
|---|---|---|---|
| 7,476,004 B2* | 1/2009 | Chan | F21K 9/278 |
| | | | 362/239 |
| 2008/0016734 A1 | 1/2008 | Basha | |
| 2009/0235554 A1* | 9/2009 | MacNeil | B60S 3/002 |
| | | | 34/524 |
| 2011/0197924 A1* | 8/2011 | Belanger | B60S 3/04 |
| | | | 134/18 |
| 2011/0277792 A1* | 11/2011 | Turner | B60S 3/00 |
| | | | 134/18 |
| 2011/0277797 A1 | 11/2011 | Turner et al. | |
| 2013/0192643 A1* | 8/2013 | Ennis | B08B 3/041 |
| | | | 134/18 |
| 2014/0223676 A1 | 8/2014 | Belanger | |

* cited by examiner

LIGHTED VEHICLE WASH DRYER ASSEMBLY CONTROL SYSTEM

CROSS-REFERENCE TO RELATED APPLICATIONS

The present application claims priority to U.S. Provisional Patent Application Ser. No. 62/208,924, entitled "Vehicle Wash Dryer Assembly", filed Aug. 24, 2015, which is hereby incorporated by reference as though set forth fully herein. The present application is also a continuation-in-part of U.S. patent application Ser. No. 14/695,773, entitled "Active Site Marketing Vehicle Wash System", filed on Apr. 24, 2015, which is a continuation-in-part of U.S. patent application Ser. No. 14/687,704, entitled "Vehicle Wash Package Selection Confirmation System", filed on Apr. 15, 2015, which claims priority to U.S. Provisional Patent Application Ser. No. 62/045,208 entitled "Vehicle Wash Package Selection Confirmation System", filed Sep. 3, 2014, the disclosures of which are also hereby incorporated by reference as though set forth fully herein.

TECHNICAL FIELD

The present disclosure relates generally to a control system for use in a vehicle wash system for treating an exterior vehicle surface. More specifically, the present disclosure relates to a control system that utilizes a lighted dryer assembly to convey information about the vehicle wash system.

BACKGROUND OF THE INVENTION

Vehicle wash systems have become a common way for vehicle owners to quickly and efficiently have their vehicles cleaned without having to wash and clean them by hand. Depending upon how dirty the vehicle is, the level of cleanliness the vehicle owner seeks to achieve, and the amount of money the vehicle owner is willing to spend, there are a variety of different types of vehicle wash systems with different service options available to meet those needs. For example, full service vehicle wash systems provide vehicle owners with both interior and exterior vehicle cleaning services. These are generally the most expensive type of vehicle wash system. Self-service type vehicle wash systems offer vehicle owners a less expensive option for cleaning their vehicles. However, with these self-service systems, vehicle owners must operate the equipment themselves to clean the interior and/or exterior of their vehicles. The most common type of vehicle wash systems are those that offer automated exterior vehicle cleaning services only and which are often embodied as conveyerized tunnel systems or roll over (in-bay) machines. In terms of price, this last type of vehicle wash systems is generally priced in between the other two types of vehicle wash systems.

Each of the above-described vehicle wash systems typically presents vehicle owners with a variety of different cleaning and treatment options and services for varying fees. For example, most vehicle wash systems (whether full service or conventional) generally offer vehicle owners a basic wash package that consists of treating a vehicle exterior with conventional cleaning services. This basic wash package is generally provided for a base fee and is often referred to as a regular or base wash. For customers that want additional treatments or services to be performed on their vehicle, many vehicle wash systems offer an upgraded package that includes additional services for payment of an increased fee, such as an under body wash or a tire shine. Other customers may want the "works" and many vehicle wash systems offer a still further upgraded package which includes all of its premium services. The additional services in these upgraded packages, which are often referred to as premium packages, can include an under body rust inhibitor or a tire polish. The premium packages are generally available at a fee that is higher than any of the other packages available.

As is known, the environment in vehicle wash systems is generally dark with little light and thus visibility for vehicle owners is usually very poor. Consequently, some wash owners have made an attempt to brighten this environment and enhance a user's wash experience though the use of lighted arches and signs, to create somewhat of a "carnival" feel. Many vehicle wash facilities also employ lights and lighted signs as a way to advertise extra wash services like tire shine, sealer wax, and triple foam as well as to drive traffic to and create more revenue for their vehicle wash facility. While these lighted arches and lighted signs may be effective in drawing consumer attention to the wash or these extra services they offer, the lighting is very selective and does little to improve the overall environment within the vehicle wash facility.

Additionally, these lighted arches and signs are generally provided outside of or at the entrance end of the vehicle wash system in order to try and attract potential customers to take advantage of the vehicle wash services or to provide a positive impression for customers before they enter the vehicle wash system. However, lighting effects have not been used at or adjacent the exit end of the vehicle wash system, which is generally the area visible to other motorists passing by the vehicle wash facility. Typically, any lights in other areas of the wash facility cannot be readily seen by others driving by the facility. Thus, the exit ends of current vehicle wash systems are still dark, noisy and relatively intimidating to both customers and potential customers. Moreover, any lights in other parts of the wash facility have only a limited effect on the marketing of wash services to vehicles passing thereby as they cannot be readily seen.

Also, due to the dark environment present in vehicle wash facilities, coupled with the fact that the vehicle windows are usually covered with soap and water during the vehicle wash process, it is very difficult for vehicle owners to see if the wash services/options they requested and paid for are being applied to their vehicle. This is true, even if they know what they are looking for. Consequently, it is not uncommon for a vehicle owner to select and pay for one package and have the wash system provide a different package. This can occur through inadvertent entry of the package selection into a system controller by a wash owner/operator or improper intent on the part of the operator of the vehicle wash system to pocket the difference between the package paid for and that provided. As this practice is known to occur and it is difficult to rectify after the fact, some vehicle owners are dissuaded from purchasing packages with additional services for fear that those services will not be provided. This has resulted in a significant loss of revenue for the car wash industry.

It would thus be desirable to provide a method and system that overcomes these disadvantages with existing vehicle wash systems.

SUMMARY OF THE INVENTION

It is therefore an aspect of the present disclosure to provide a lighted dryer assembly for a vehicle wash facility that provides improved aesthetics.

It is another aspect of the present disclosure to provide a lighted dryer assembly for a vehicle wash facility that enhances customer experience during the wash process.

It is a further aspect of the present disclosure to provide a lighted dryer assembly for a vehicle wash facility that assists in creating and/or enhancing brand recognition.

It is a still another aspect of the present disclosure to provide a lighted dryer assembly for a vehicle wash facility that can brighten the environment therein and particularly at an exit end of the wash facility.

It is yet another aspect of the present disclosure to provide a lighted dryer assembly for a vehicle wash facility that yields enhanced brightness and aesthetics when the vehicle wash system is not in use.

It is still yet another aspect of the present disclosure to provide a lighted dryer assembly for a vehicle wash facility that provides confirmation to a customer that a particular event is occurring, such as an ordered service.

It is yet a further aspect of the present disclosure to provide a vehicle wash system that provides improved diagnostic information to a vehicle wash operator to facilitate efficient operation of the system.

It is still yet a further aspect of the present disclosure to provide a vehicle wash system that can assist in increased revenue generation.

It is still yet a further aspect of the present disclosure to provide a vehicle wash system that can assist with marketing of the vehicle wash facility.

In accordance with the above and the other aspects of the disclosure, a vehicle wash system is provided. The system has an entrance end and an exit end and includes a dryer element disposed adjacent the exit end. The dryer element includes an inlet, a housing, and at least one outlet for emitting high velocity air onto an exterior surface of a vehicle. The dryer element includes at least one light source associated therewith. The at least one light source has a plurality of modes with each of the plurality of modes associated with a distinct system condition. The system includes a controller in communication with the at least one light source and configured to receive data and to activate one of the plurality of modes in response to the system condition in effect based on the received data. In at least one of the plurality of modes, the controller directs the at least one light source to emit light in a predetermined color.

BRIEF DESCRIPTION OF THE DRAWINGS

Other aspect of the present disclosure will be readily appreciated, as the same becomes better understood by reference to the following detailed description when considered in connection with the accompanying drawings wherein.

DETAILED DESCRIPTION OF THE INVENTION

Figure 1:
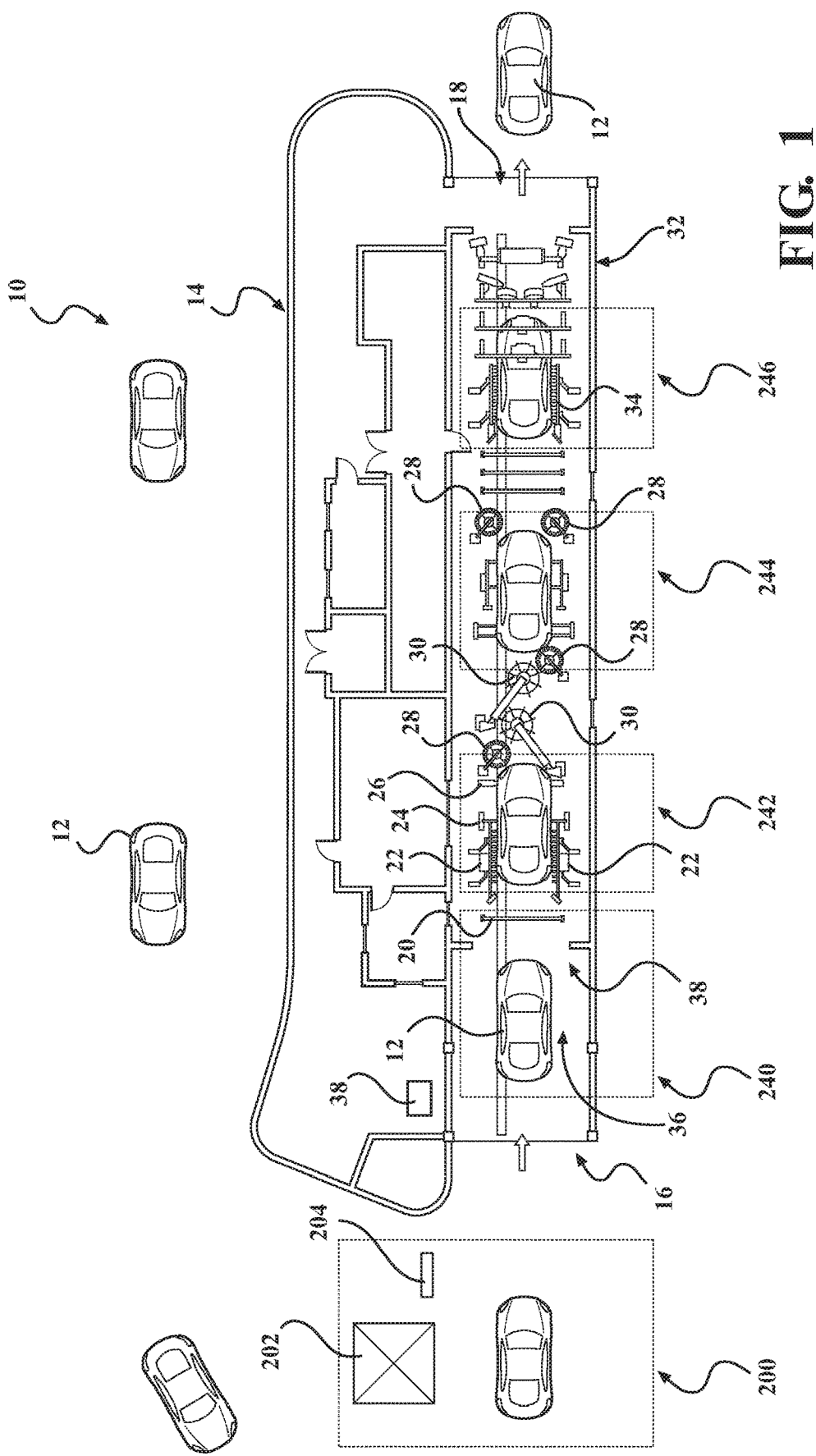
FIG. 1 is a schematic illustration of a vehicle wash system having a plurality of vehicle wash components in accordance with an aspect of the disclosure.

According to an aspect, the present disclosure relates to a vehicle wash system 10. As shown in FIG. 1, the system 10 may be configured as a tunnel car wash, where a vehicle 12 is conveyed through the wash process by a conveyor or the like as is known in the art. Alternatively, the vehicle wash system 10 may be configured as a roll-over type where the vehicle 12 remains stationary and wash components move with respect to the vehicle 12 to perform the vehicle wash process. Other suitable wash processes and systems may also be employed. It will be appreciated that the disclosed system could also be employed in connection with a variety of other vehicle wash systems including, full service, manual or self-serve wash processes.

According to an aspect, the vehicle wash system 10 may be housed within a vehicle wash facility 14 having an entrance end 16 where a vehicle enters and an exit end 18 where the vehicle leaves. According to a further aspect, the vehicle wash system 10 may also include a variety of vehicle wash components that engage and/or treat the exterior of the vehicle 12 as it passes through the vehicle wash facility 14 to effectuate the vehicle wash process. For example, as illustratively shown in FIG. 1, the vehicle wash system 10 can include a rinse arch 20, which sprays water onto the vehicle. The system 10 can also include a pair of wheel scrubbers 22 for cleaning vehicle wheels as well as the lower portion of a vehicle. Additionally, the system 10 may include a top wheel or brush 24 for cleaning an upper exterior surface of a vehicle. Moreover, the system 10 can also include a bubble or foam delivery device 26 that generates bubbles and emits them directly onto the vehicle exterior.

According to another aspect, the system 10 can include one or more side brushes 28 for contacting side exterior surfaces of a vehicle and a plurality of wrap brushes 30 for contacting both front and back vehicle surfaces. The system 10 can also include a drying section 32 for removing water from the vehicle exterior. According to a further aspect, the system 10 can include a wheel polishing device 34. It will be appreciated that more, less or different wash components may be employed as part of the vehicle wash system. For example, the system 10 may also include components for treating the vehicle undercarriage, for applying body sealant, and for applying polish wax to the vehicle and/or performing a variety of different functions. Additionally, multiples of the same components may be employed as part of the system as desired. Further, the components may take on a variety of different configurations. Moreover, the order, placement and sequence of the components within the system 10 may also vary. According to an aspect, the components may be designed to engage and/or treat the vehicle 12 as it is disposed within a vehicle treatment area 36 of the vehicle wash facility 14.

According to an aspect, the vehicle wash system 10 may include a controller 38 that is in communication with all of the treatment components so that the system 10 may operate automatically under computer control. According to another aspect, the controller 38 may be employed to direct the operation and timing of the vehicle wash components. For example, the controller 38 could signal certain vehicle components to start operating as a vehicle approaches and then signal them to shut down after the vehicle has passed. It will be appreciated that the vehicle wash system 10 could include a variety of sensors or sensing devices to track the location of the vehicles within the system and communicate that information to the controller 38. It will also be appreciated that a computer, processor or other suitable control device may alternatively be employed to control the system and its components. According to further aspect, each of the vehicle wash components, i.e., 20, 22, 24, 26, 28, 30, 32 and 34 utilized in the vehicle wash system 10 can include a light source associated therewith, as discussed in more detail below.

According to an aspect, the present disclosure relates to the drying section 32. As is known, the drying section 32 may be disposed adjacent the exit end 18. According to an aspect, the drying section 32 can include one or more dryer assemblies 100.

Figure 2:
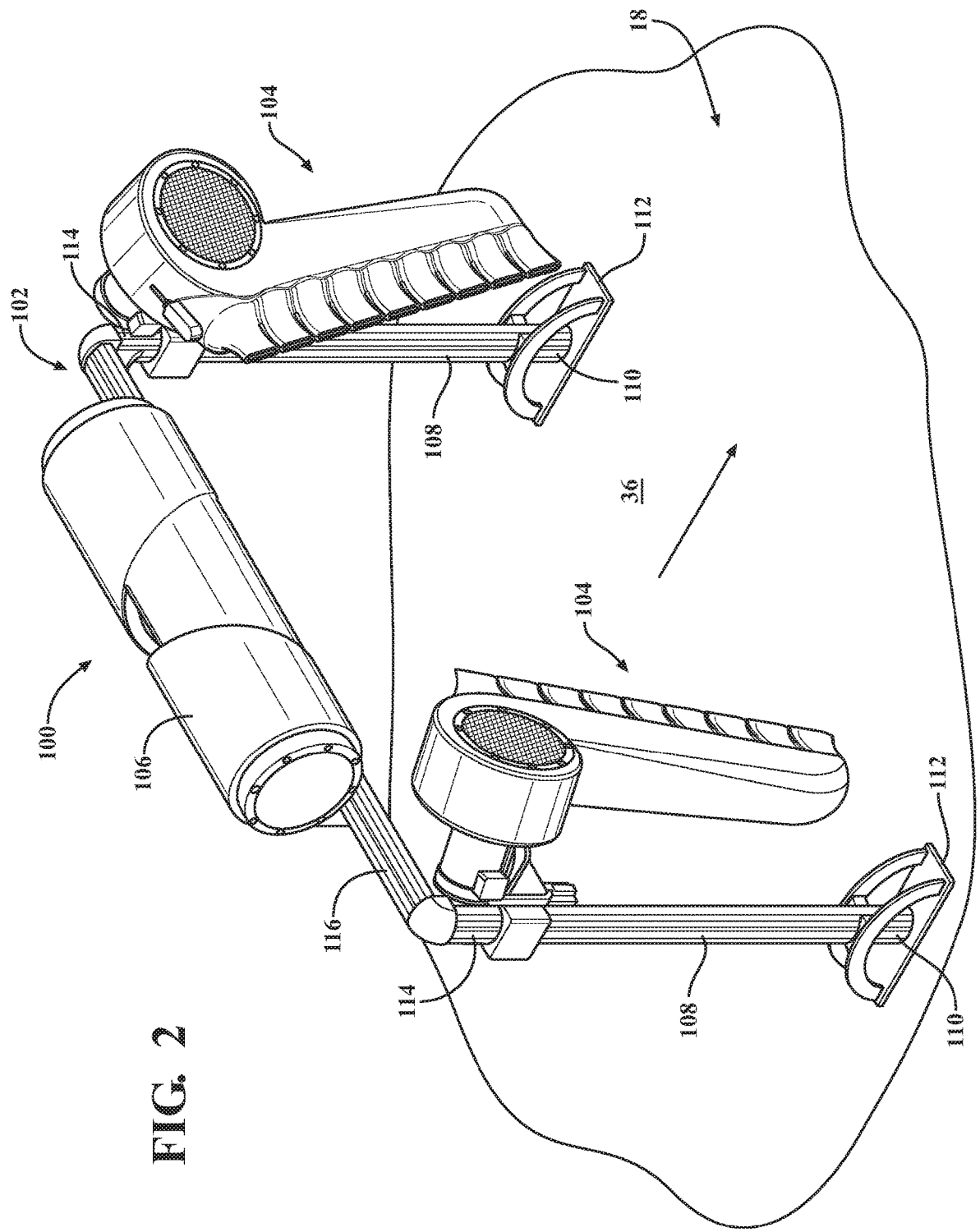
FIG. 2 is a perspective view of a lighted vehicle wash dryer assembly including a pair of opposing blower assemblies in accordance with an aspect of the present disclosure.
Figure 3:
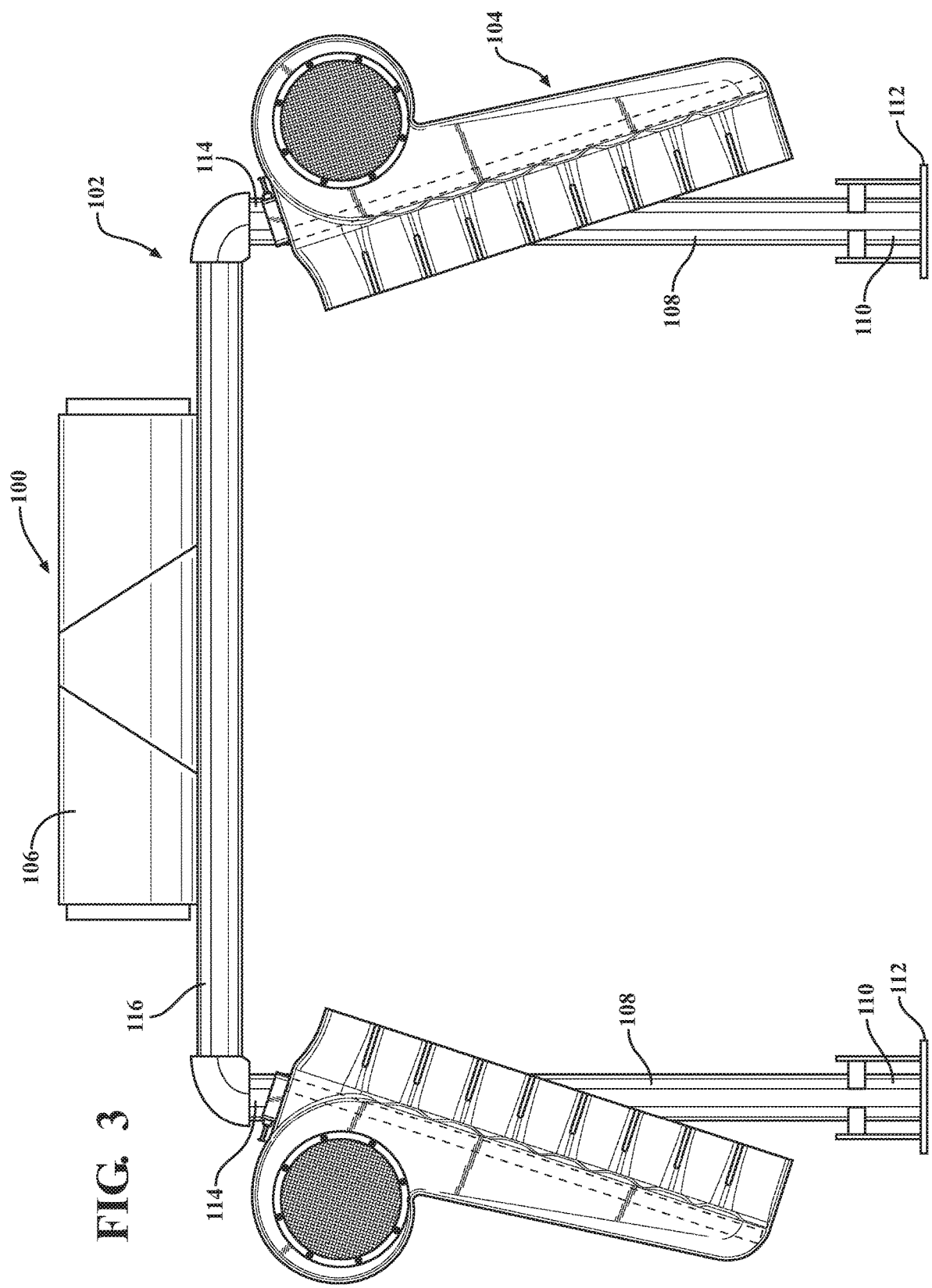
FIG. 3 is a front view of a lighted vehicle wash dryer assembly including a pair of opposing blower assemblies in accordance with an aspect of the present disclosure.

With reference to FIGS. 2 and 3 illustrate an exemplary dryer assembly 100 in accordance with an aspect. As shown, the dryer assembly 100 can include a frame portion 102, a pair of side dryer units 104, which are disposed on the frame portion 102 on either side of a vehicle treatment area 36 to direct air onto side vehicle surfaces, and an overhead blower assembly 106 disposed on the frame 102 to direct air onto an upper exterior surface of a vehicle in the vehicle treatment area 36. According to an aspect, the frame portion 102 can include a pair of leg portions 108, which are disposed on either side of the vehicle treatment area 36. Each leg portion 108 can include a lower end portion 110, which can engage a base portion 112 that rests on the ground to hold the leg portions 108 in a generally vertical position. The leg portions 108 can each also include an upper end portion 114 which can engage an overhead cross-piece portion 116 that spans the vehicle treatment area 36. It will be appreciated that the dryer assembly 100 and the frame portion 102 can take on a variety of different configurations. It will also be appreciated that more or less or differently configured blower assemblies 104 may be employed on the frame portion 102 and that they may be disposed in different locations on the frame portion 102.

FIGS. 4 through 8 schematically illustrate a dryer unit 120 for a dryer assembly 100 in accordance with an aspect of the disclosure. According to an aspect, the dryer unit 120 can include a housing 130 with an upper head portion 132, a body portion 134, and an outlet portion 136 including a plurality of nozzle portions 138. According to an aspect, the dryer housing 130 may be a single integral structure that is formed from a plastic material in a rotational molding process. It will be appreciated that the housing 130 may be formed from a variety of different materials and that a variety of other suitable processes may be employed. According to a still further aspect, the housing 130 may be formed of a transparent or translucent material. Additionally, the housing 130 may be formed in a variety of different colors. It will also be appreciated that the housing 130 can have a variety of different configurations.

Figure 7:
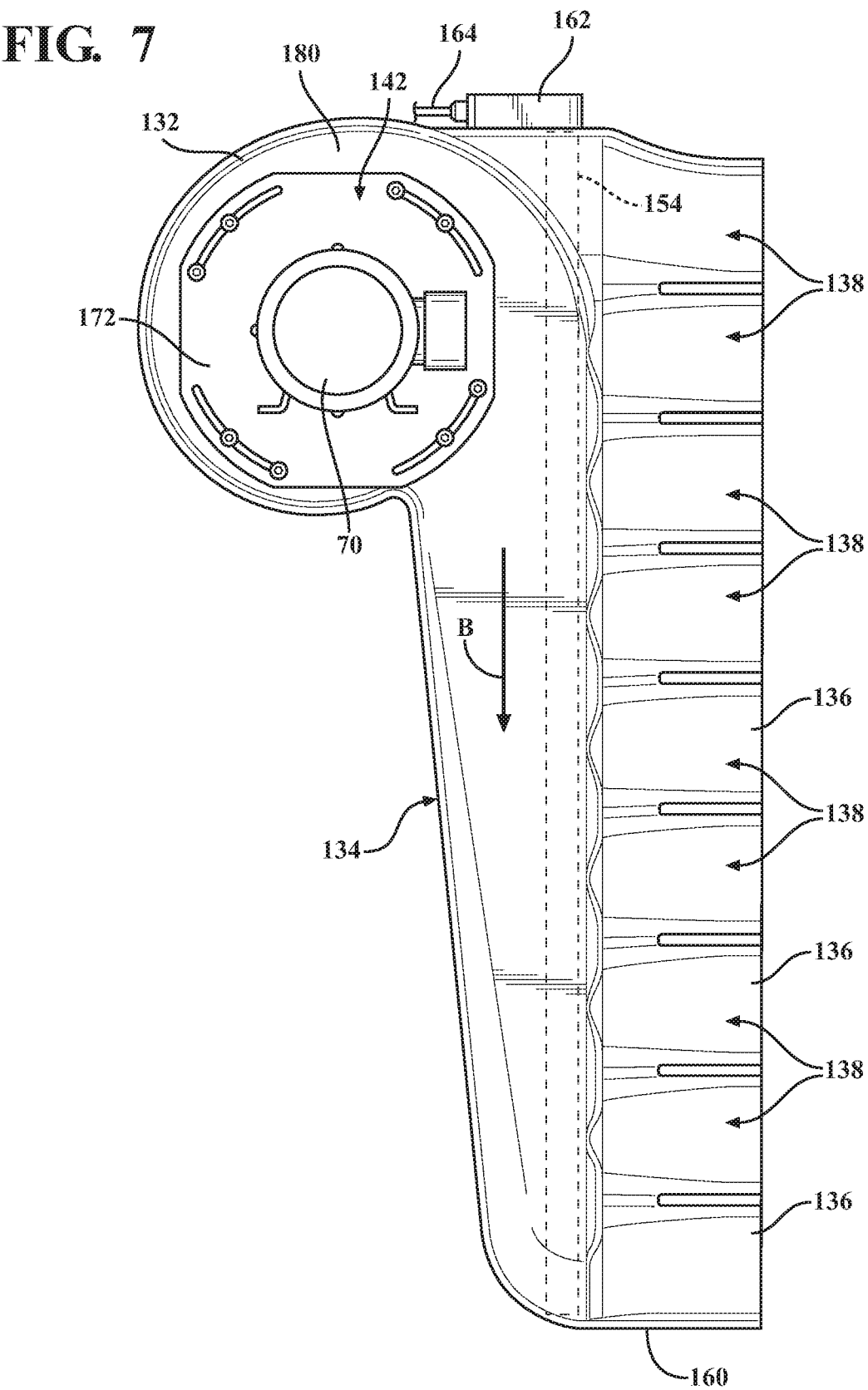
FIG. 7 is a side view of a dryer unit in accordance with an aspect of the present disclosure.
Figure 8:
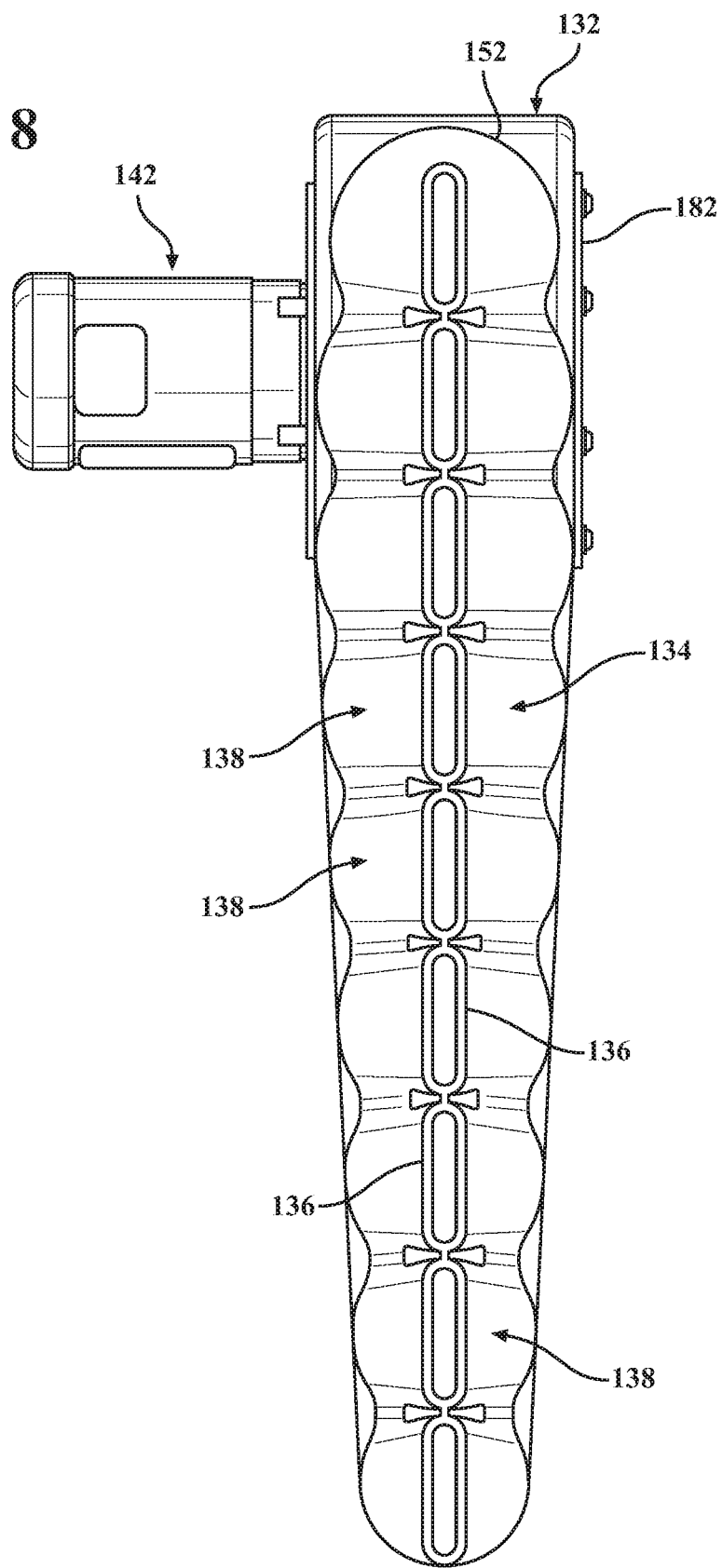
FIG. 8 is a front view of a blower assembly in accordance with an aspect of the present disclosure.

According to a further aspect, the upper head portion 132 can include a motor assembly opening 140 for receipt of a motor unit 142, as shown best in FIGS. 7 through 8. The motor assembly opening 140 may be in communication with an interior blower cavity 144 disposed in the body portion 134 by way of an inlet opening 146. According to an aspect, the blower cavity 144 may serve as an air passageway that conveys air from the motor unit 142 toward a lower portion of the housing 130 in a direction generally indicated by arrow B. The interior blower cavity 144 may be in communication with each of the plurality of nozzle portions 138. According to another aspect, the nozzle portions 138 may be configured to generally taper outwardly from the body portion 134 to an air exit outlet 148. According to an aspect, the air exit outlets 148 each have an area that is substantially smaller than the size of an area of the inlet opening 146. It will be appreciated that the nozzle portions 138 can have a variety of other configurations.

According to another aspect, a clearance opening 150 may be formed in an upper surface 152 of the body portion 134. According to a further aspect, a clear elongated housing structure 152, such as a clear PVC pipe may be inserted into the clearance opening 150 and into the interior blower cavity 144. According to yet another aspect, an illumination or light source 156 may be disposed in the elongated housing structure 154 so that one or more illumination sources may be located within the housing 130. The illumination source 156 may be an array of light emitting diodes (LEDs); however a variety of other suitable illumination sources may be employed. According to an aspect, the illumination sources may be LEDs that are configured to emit light in accordance with the RGB color convention as directed by a controller 158. For example, the illumination source 156 may be directed to emit a variety of different colors. According to another aspect, the controller 158 may be configured to cycle the illumination source 156 through a variety of different colors. According to an aspect, the elongated housing structure 154 may be configured as a pipe and may extend the full height from the upper surface 152 to the lower surface 160 of the housing 130. It will be appreciated that it could extend a lesser portion of the height.

According to another aspect, the light source 156 could be otherwise associated with the dryer unit 120 such that it could illuminate the interior of the housing 130. According to another aspect, the light source 156 could be disposed behind the housing 130 and the housing 130 could have an opening disposed adjacent the light source 156 such that the light could illuminate the interior of the housing 130 as well as the housing itself. According to a further aspect, the housing 130 could serve as a light pipe such that the light source 156 can be positioned to illuminate the interior of the housing 130, such as by positioning the light source 156 adjacent an edge thereof to make the housing 130 glow to provide a lighted effect. It will be appreciated that the light source 156 could be disposed in a variety of other locations to illuminate the housing 130.

It will also be appreciated that the elongated housing structure 154 can take on a variety of different configurations and may be formed of different materials and may be formed of different colors. For example, the elongated housing structure 154 may be formed of a translucent material. It will be appreciated that any number of illumination sources 156 may be employed within the housing 130. The illumination sources 156 may be connected to, disposed within or associated with the housing 130 in a variety of suitable ways. It will be further appreciated that more than one elongated housing structure 154 may be disposed in the housing 130 to hold multiple illumination sources 156. It will also be appreciated that the elongated housing structure 154 and the illumination sources 156 can be combined in a single unit. Alternatively, one or more illumination sources 156 may be disposed in the housing 130 independent from and without any elongated housing structure 154.

Figure 4:
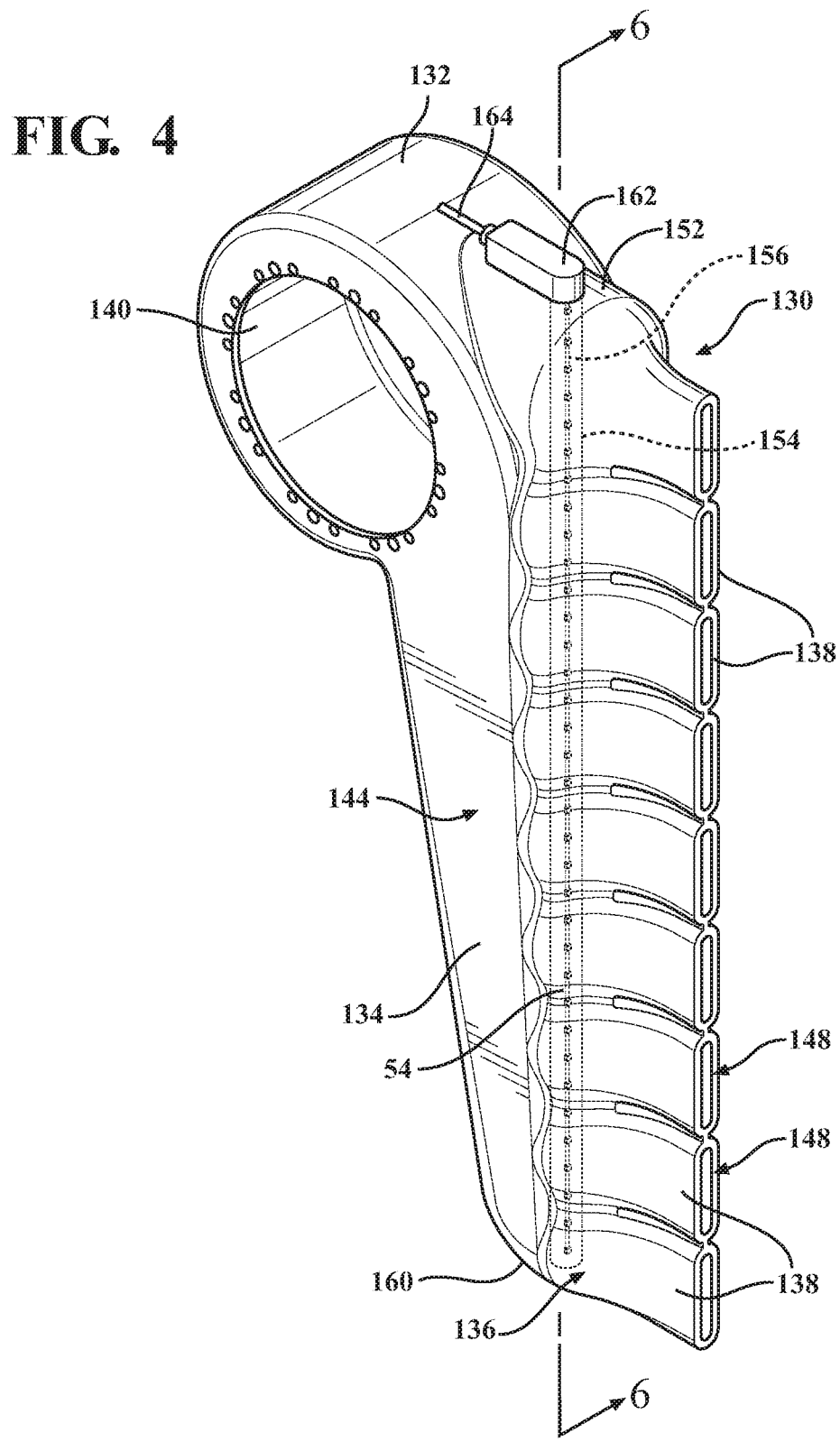
FIG. 4 is a schematic illustration of a blower housing for a dryer unit with an illumination source therein in accordance with an aspect of the present disclosure.
Figure 5:
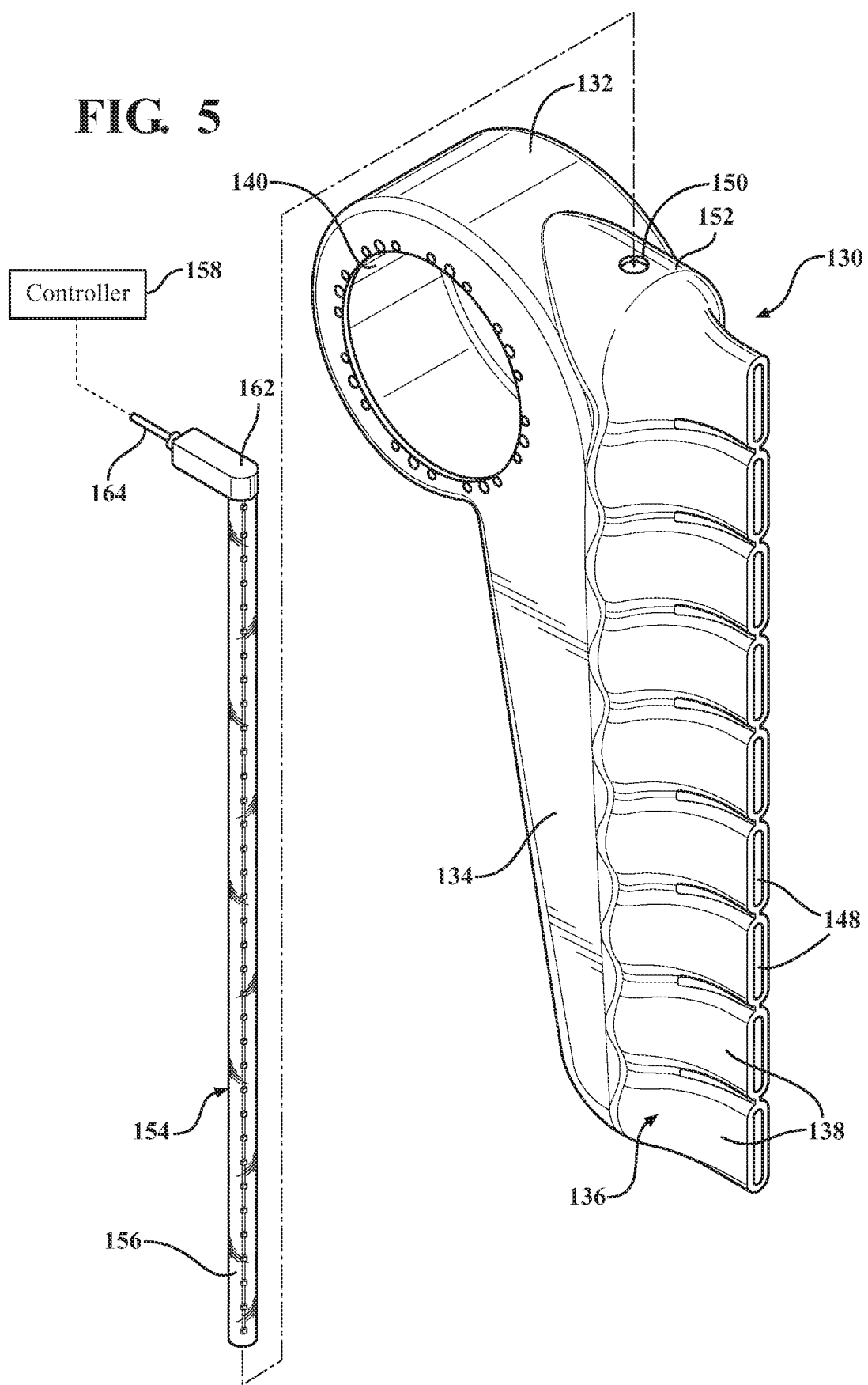
FIG. 5 is an exploded view of a blower housing for a dryer unit and illumination source in accordance with an aspect of the present disclosure.
Figure 6:
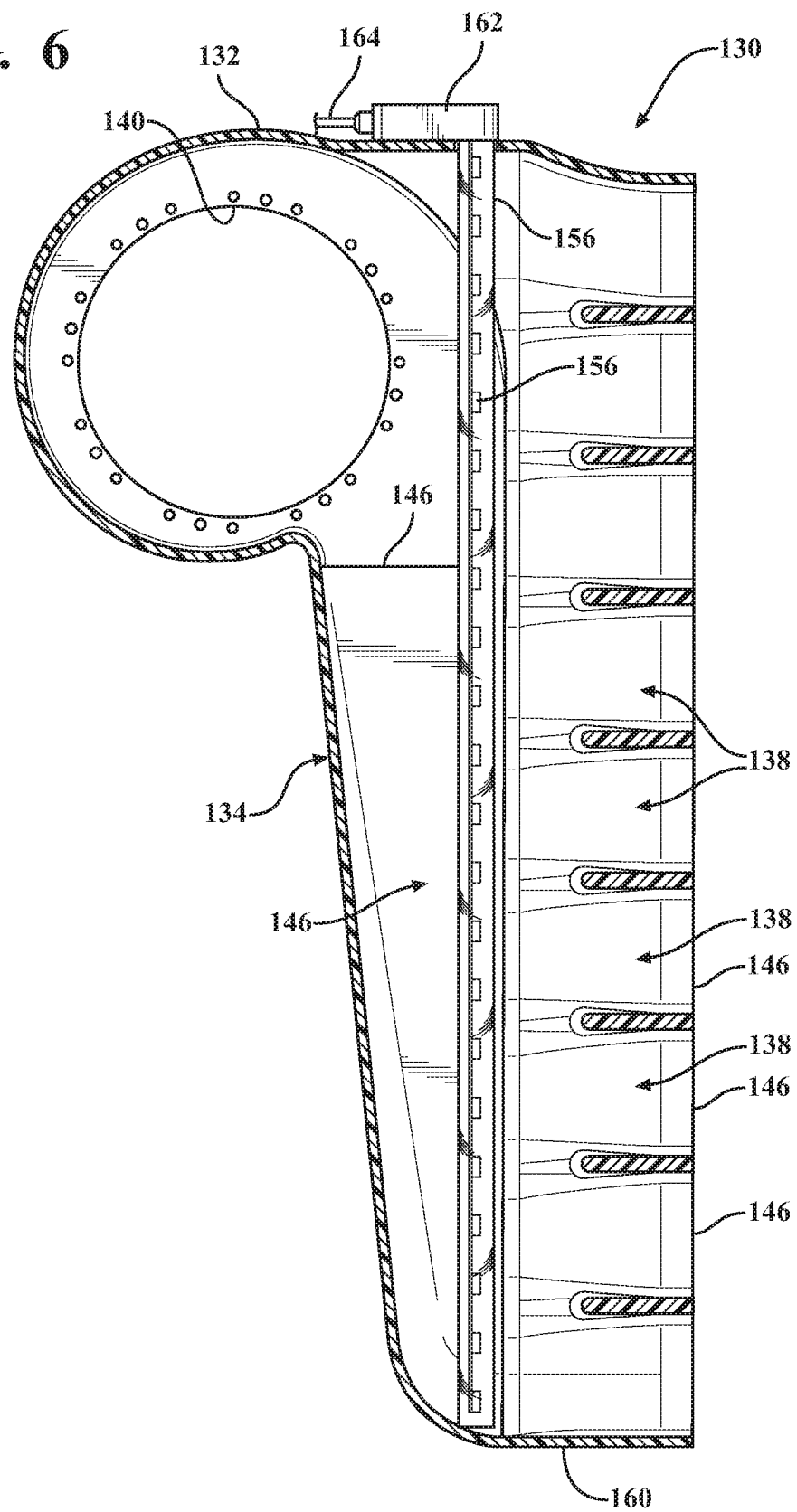
FIG. 6 is a cross-sectional view of the dryer unit housing of FIG. 4 in the direction of the arrows 6-6.

According to an aspect and with reference to FIGS. 4 through 6, a conduit box 162 may be disposed on the upper surface 152 of the body portion 134. The conduit box 162 may be configured to effect an electrical connection between the illumination sources 156 and an electrical power source (not shown). According to an aspect, an electrical cord 164 may extend from the conduit box 162 for communication with the controller 158 to control lighting of the illumination sources 156. As will be appreciated, the conduit box 162 can include components for assisting the enabling and disabling of the illumination sources 156, as directed by the controller 158. According to a further aspect, the controller 158 can turn the illumination sources 156 on to emit light through the housing 130 (enabled mode) and off such that no light is emitted from the illumination sources 156 (disabled mode). It will also be appreciated that the controller 158 can be in communication with other light sources in the vehicle wash system, including associated with other vehicle wash components, such that the illumination sources 156 may be activated and synchronized with other light sources in connection with a package confirmation function, as is disclosed in Applicant's co-pending U.S. patent application Ser. No. 14/687,704, filed Apr. 15, 2015, and entitled "Vehicle Wash Package Selection Confirmation System" and/or an active site marketing function, as is disclosed in Applicant's co-pending U.S. patent application Ser. No. 14/695,773, filed Apr. 24, 2015, and entitled "Active Site Marketing Vehicle Wash System", both of which are hereby incorporated by reference as though set forth fully herein.

FIGS. 7 and 8 illustrate a motor unit assembly 142 for a dryer assembly 100 in accordance with an aspect of the disclosure and attachment thereto to the blower housing 130. According to an aspect, the motor unit assembly 142 can include a motor 170. The motor 170 may be in communication with a mount plate 172 which may be employed to secure the motor unit assembly 142 to a first side 180 of the upper head portion 132 of the blower housing 130. According to an aspect, the motor 170 may include a high speed impeller 174 via an opening in the mount plate 172. According to a further aspect, in operation, upon actuation of the motor unit 170, the impeller 174 may be caused to rotate to draw air into the second side 182 of the upper head portion 132. An air inlet portion may be secured to the second side 182 of the upper head portion 132. The air inlet portion may have a mesh layer disposed over an air inlet opening to prevent large objects from being drawn into the upper head portion 132 when the impeller is operating. According to another aspect, the motor 170 may be an electric motor that is in communication with a source of power. However, a variety of other suitable types of motors or other power sources may be employed.

According to an aspect, the illumination source 156 has an enabled mode and a disabled mode. In the enabled mode, the illumination source 156 may be activated by the controller 158 enabled such that it emits light. The emitted light can pass through the clear elongated housing structure 154 and through the translucent housing 130. According to an aspect, the illumination source 156 can also cause the body of the housing 130 to glow, which provides a unique aesthetic appearance. In the disabled mode, the illumination source 156 may be turned off by the controller 158 such that no light is emitted therefrom and the housing 130 may be dark. The illumination sources 156 can be disposed in the housing in a variety of different locations and can be secure to the outside of the housing or formed as an integral unit with the housing.

Figure 9:
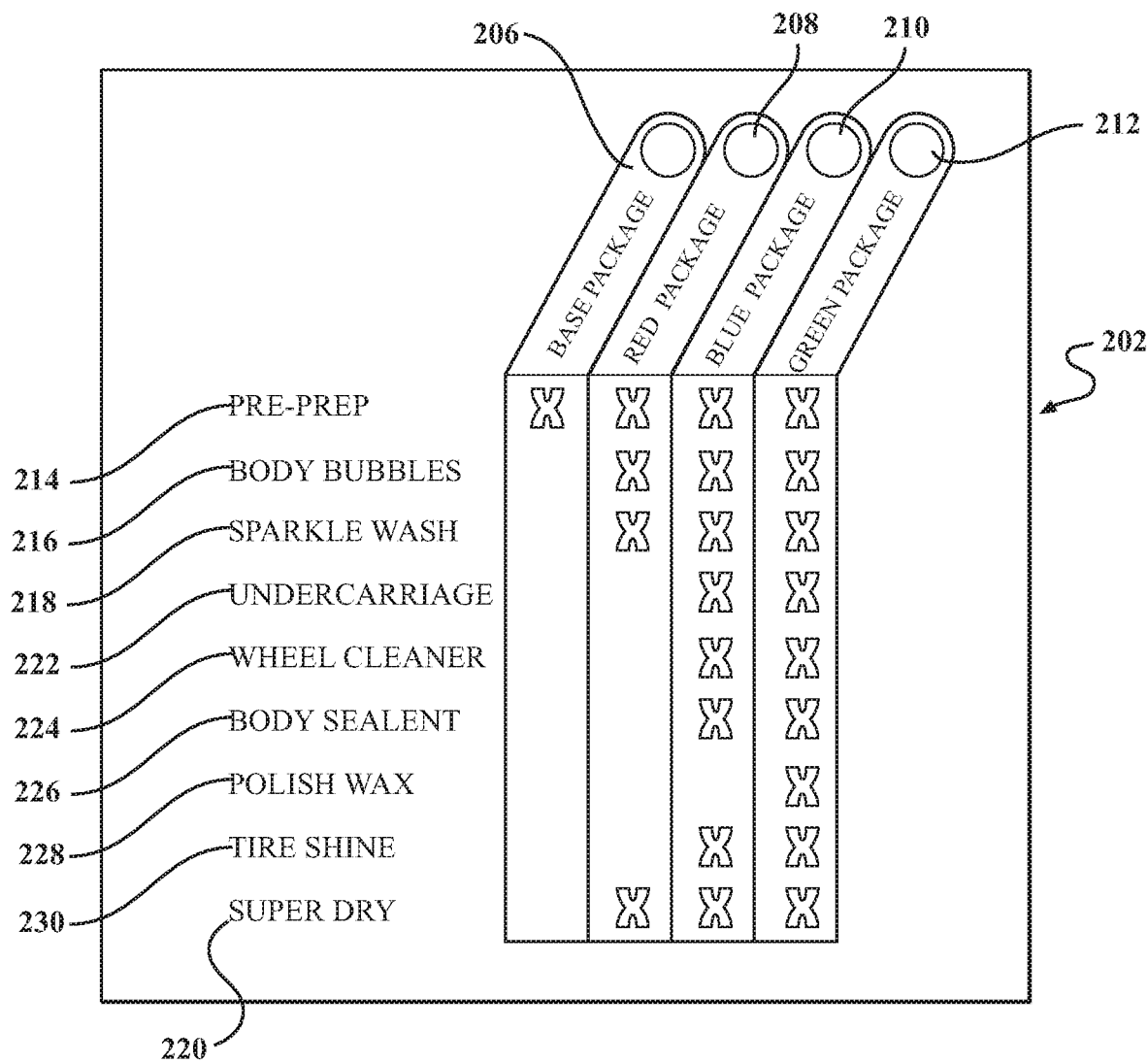
FIG. 9 is an exemplary package menu sign for a vehicle wash system in accordance with an aspect of the disclosure.

According to an aspect, the disclosure also relates to a method of conveying information to a vehicle owner or a vehicle wash operator. In accordance with one aspect, when a vehicle arrives at the vehicle wash facility, the vehicle can encounter a package selection zone 200 where a vehicle operator is presented with various treatment packages and associated prices for treatment of the vehicle. The various treatment options may be presented to the vehicle occupant in a variety of different ways. According to an aspect, they may be presented to the vehicle occupant on a display screen, a menu board, or a variety of other suitable ways. An exemplary menu board is schematically depicted in FIG. 9 as reference number 202. Once the vehicle operator has decided which vehicle treatment package to purchase, they may indicate their package selection in a variety of different ways. According to another aspect, the vehicle operator may stop at an operator station, generally designated by reference number 204, and convey their package selection to an operator who can manually input that selection into a computer or controller to start the process. According to another aspect, the vehicle operator may enter their selection electronically such as on an electronic terminal that also allows for selection of the desired package selection and payment at that terminal as will be understood by one of ordinary skill in the art. Once their selection is input, the controller 38 can track that operator's vehicle as it travels throughout the wash process and can direct that the services associated with the package selected by the operator be performed.

With reference to FIG. 9, the disclosed vehicle wash system 10 can offer various treatment packages that are identified by different identifiers and each have different services associated therewith. As discussed above, these may be presented on a menu board or display. According to an aspect, the primary identifier associated with the various treatment packages of the present disclosure may be a color. For example, with reference to FIG. 9, the Base package, as generally indicated by reference number 206, may be identified as the White package and may be designated by the color white or no color. The Red package, which includes additional wash services over the White package, is generally indicated by reference number 208, and may be designated by the color red. The Blue package, which includes additional wash services over and above the White package and the Red package, is generally identified by reference number 210, and may be designated by the color blue. The Green package, which can include the most wash services of the various packages available, is generally identified by reference number 212, and may be designated by the color green. It will be appreciated that more or less packages may be presented to vehicle occupants. It will also be appreciated that the various packages can be assigned any color or any other identifier.

According to an aspect and with continued reference to FIG. 9, the services offered with the Base package may be a standard wash and include a pre-prep service, which is generally by reference number 214. According to another aspect, with the Red package the vehicle occupant can also get the pre-prep wash 214 along with additional services, including body bubbles, identified generally by reference number 216, sparkle wash, generally identified by reference number 218, and super dry, generally identified by reference number 220. As will be appreciated, the vehicle occupant may elect to purchase the Red package for an additional fee over and above the fee for Base package.

Further, with the Blue package, the vehicle occupant may receive additional services in addition to those offered with the Red package, including undercarriage cleaning, generally identified by reference number 222, wheel cleaning services, generally identified by reference number 224, body sealant, generally identified by reference number 226, and tire shine services, generally identified by reference number 228. According to an aspect, the vehicle occupant may purchase the Blue package for a fee that is greater than the Red package.

According to a further aspect, the Green package can offer the vehicle occupant the most services. According to an aspect, the Green packages can offer the vehicle occupant all the same services available with the Red package as well as an additional polish wax service, generally identified by reference number 230.

According to an aspect, once the vehicle occupant has selected the color package option and that selection has been entered into and recognized by the controller 38 of the computer system, the vehicle wash system 10 can be coordinated such that the color of the illumination elements associated with the dryer assembly 100 matches the color of the vehicle owner's selected package. In other words, the colors emitted from the light sources associated with the dryer assembly 100 may be coordinated with a customer's package purchase. Thus, as the vehicle approaches the dryer section 32, the illumination source 156 associated with the dryer housing 130 may be directed by the controller 38 to emit a color that matches the color of package selected by the vehicle owner. According to an aspect, the controller 38 could also be in communication with the illumination elements associated with the other wash components to control their operation and match their color to the color assigned to the selected package option. For example, the controller 38 may operate all the illumination elements in accordance with a DMX protocol. According to another aspect, a separate DMX controller could be utilized to control the lighting of the illumination elements. The DMX controller could be employed as a laptop. The DMX controller could also include software that allows the controller to accomplish the functionality described herein. The DMX controller could take on a variety of other configurations.

According to an aspect, after the vehicle occupant's package selection purchase has been entered into the system, the vehicle can proceed through the entrance end 16 of the vehicle wash facility 14. According to an aspect, the controller 38 together with the sensors and other devices can track the location of the vehicle within the wash system 10. According to a further aspect, the vehicle 12 can travel to a first vehicle zone 240. According to an aspect, the lights on all of the components in and adjacent the first vehicle zone 240 can be illuminated with a color that matches the package selection by the vehicle occupant. Thus, if the vehicle occupant selected the "Blue" package, the illumination elements of all of the components in or adjacent the first vehicle zone 240 can emit a blue light as controlled by the controller 38 to provide visual confirmation to the vehicle occupant that they are getting the proper vehicle treatment services that they selected and paid for. It will be appreciated that the illumination elements can be associated with the first vehicle zone 240 in other ways other than with the components, including signs and displays.

According to another aspect, as the vehicle 12 proceeds into a second vehicle zone 242, the illumination elements of the components in the second vehicle zone 242 may be illuminated in the color blue to match that of the vehicle occupant's blue package selection. According to another aspect, as the vehicle 12 proceeds into a third vehicle zone 244, the controller 38 can direct the illumination elements on the components in the third vehicle zone 244 to emit a color matching the vehicle occupant's section, which according to this example is blue. According to a still further aspect, as the vehicle 12 proceeds into a fourth vehicle zone 246, the illumination elements of the components in the fourth vehicle zone 246 may be illuminated in a color to match that of the vehicle occupant's package selection as directed by the controller 38. It will be appreciated that the vehicle wash system 10 could be divided or broken down into more or less zones. It will also be appreciated that fewer than all of the components in a particular zone could be directed to emit light in a color matching that of the vehicle occupant's selection. It will also be appreciated that the illumination elements need not be associated with the component, but could otherwise be associated with the various vehicle zones.

According to another aspect, the controller 38 may control the lighting of the components within the vehicle wash system 10 to handle multiple vehicles within the wash system 10 at a given time at least two of which may have selected different packages. For example, a first vehicle occupant could enter the package selection zone 200 and select the Red colored package. After the fee is paid for this package, it could be entered into the system and recognized by the controller 38. As the first vehicle proceeds toward the first vehicle zone 240, the illumination elements associated with the first vehicle zone 240 can be colored red to match that vehicle's package selection. According to an aspect as the first vehicle enters the first vehicle zone 240, a second vehicle can enter the package purchase zone 200.

In this example, the second vehicle 12 may select to have the Green package option for treatment of their vehicle. Again, after payment is received, this can be entered into the system and recognized by the controller 38. As the first vehicle proceeds into the second vehicle zone 242, the illumination elements in that zone can be colored red to correspond to the package selection of the first vehicle. At the same time, the controller 38 can direct that the illumination elements in the first vehicle zone 240 be colored green so that they match the color of the package selection made by the second vehicle which has just entered the first vehicle zone 240. With the first vehicle in the second vehicle zone 242 and the second vehicle in the first vehicle zone 240, a third vehicle can enter the package selection zone 200 and select a package option for treatment of their vehicle. According to this example, the third vehicle can select a Blue package.

According to this example, as the first vehicle 12 moves to the third vehicle zone 244, the illumination elements associated with that zone can be colored red to match the package selection made by the vehicle occupant. Also, as the second vehicle 12 moves to the second vehicle zone 242, the illumination elements associated with that zone can now be colored green to correspond to the package selection made by the second vehicle occupant. Additionally, as the third vehicle 12 moves into the first vehicle zone 240, the illumination elements associated with that zone can be colored blue to match that vehicle's package selection.

Continuing further with this example, as the first vehicle moves to the fourth vehicle zone 246, the illumination elements associated with that zone may be colored red to match that vehicle's package selection. As the second vehicle 12 moves to the third vehicle zone 244, the illumination elements associated with that zone can now be colored green to correspond to this vehicle's package selection. Also, as the third vehicle 12 moves to the second vehicle zone 242, the illumination elements associated with that zone can now be colored blue.

As the first vehicle 12 leaves the vehicle wash system 10 through the exit end 18, the second vehicle can move into the fourth vehicle zone 246. As the second vehicle moves into the fourth vehicle zone 246, the illumination elements associated with that zone can be colored green as directed by the controller 38. At the same time, the third vehicle can then move into the third vehicle zone 244 where the illumination elements can be colored blue. As the second vehicle exits the facility through the exit end 18, the third vehicle 12 can move to the fourth vehicle zone 246 where the illumination elements can be colored blue. The third vehicle can then also leave out of the exit end 18. It will be appreciated that the system 10 could be employed with more or less vehicles which have selected the same or different packages.

Figure 10:
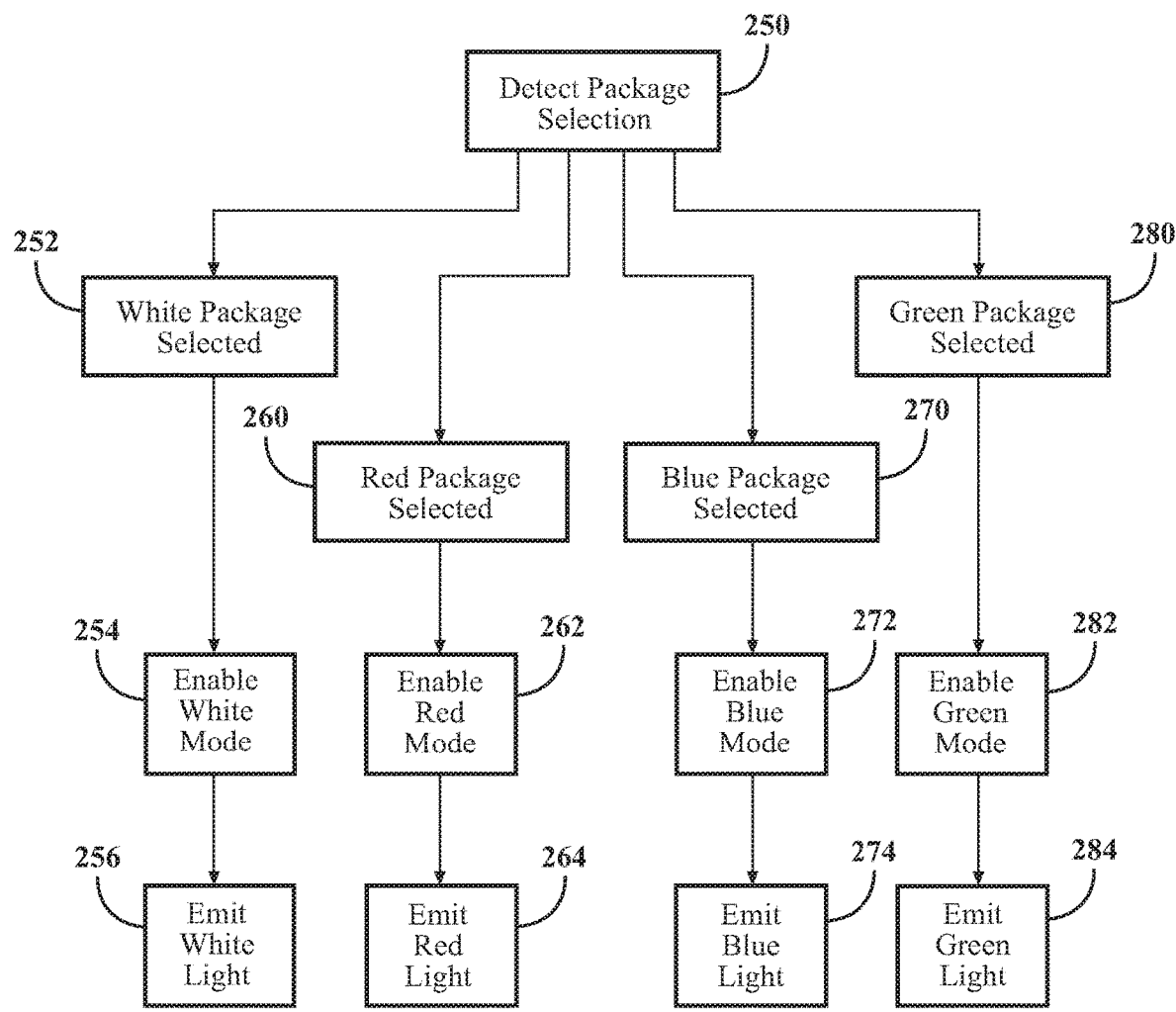
FIG. 10 is a schematic diagram illustrating a method of operating a vehicle wash system according to an aspect of the disclosure.

FIG. 10 is a block diagram illustratively showing a method of package confirmation according to an aspect. As shown, according to an aspect, the system can detect a package selection from a vehicle owner as generally indicated by reference number 250. If the system detects a selection of a White package, as generally indicated by reference number 252, the White mode of the illumination elements 156 associated with the dryer assembly 100 is enabled as generally indicated by reference number 254 when the vehicle 12 approaches or is in the drying section 32. Upon the White mode being enabled, the illumination elements can emit light in a white color, as generally indicated by reference number 256.

According to another aspect, if the system detects a selection of a Red package, as generally indicated by reference number 260, the Red mode of the illumination elements 156 associated with the dryer assembly 100 may be enabled as generally indicated by reference number 262. Upon the Red mode being enabled, the illumination elements can emit light in a red color, as generally indicated by reference number 264. According to a further aspect, if the system detects a selection of a Blue package, as generally indicated by reference number 270, the Blue mode of the illumination elements 156 associated with the dryer assembly 100 may be enabled, as generally indicated by reference number 272 when the vehicle approaches or is in the drying section 32. Upon the Blue mode being enabled, the illumination elements can emit light in a blue color, as generally indicated by reference number 274. According to yet another aspect, if the system detects a selection of a Green package, as generally indicated by reference number 280, the Green mode of the illumination elements 156 associated with the dryer assembly 100 may be enabled as generally indicated by reference number 282 when the vehicle 12 approaches or is in the drying section 32. Upon the Green mode being enabled, the illumination elements can emit light in a green color, as generally indicated by reference number 284.

According to another aspect, the system could be configured so that the light sources emit colors for useful proposes as opposed to for primarily aesthetic purposes. According to another aspect, the light sources could be programmed to convey other information to a vehicle owner. For example, the system could be configured so that the light sources can emit colors for navigational purposes. According to an aspect, sensors in the system could detect a variety of inputs, including vehicle location and speed and communicate that to the system controller. The controller can then enable the light sources associated with the dryers to emit light in a particular color based on these detected inputs. For example, if the system determines that a vehicle is going too fast, the controller can direct the light source to emit a yellow color communicating to the vehicle operator that they should slow down. Additionally, the controller could direct the light source to emit a red light telling the vehicle to stop. Similarly, the controller could direct the light source to emit a green color to let the vehicle operator know that it is clear for the vehicle to proceed. Other colors could be utilized to communicate other navigational information. According to a further aspect, the light sources could employ the RGB color model, where red, green, and blue light are added together in various ways to reproduce a broad array of colors, as is known.

According to an aspect, the light sources on the dryer assembly 100 could be configured to separately emit lights of different colors sequentially when the vehicle is in or approaching the dryer section 32. According to another aspect, the light sources may each be in communication with the controller 38 so that they may be programmed to emit the same color from each of the dryer units 104 in synchronization or unison. According to another aspect, the controller 38 could be programmed to emit colors in a particular pattern or sequence. For example, the following color sequence could be emitted from each component: blue, followed by red, followed by green, followed by yellow. It will be appreciated that different colors could be emitted from the components in different orders. For example, if the RGB color sequence is employed, an infinite number of colors could be created and emitted from the light sources in a controlled fashion. According to an aspect, controlling light sources such that colored lights from various components are emitted in unison or simultaneous provides significant aesthetic benefits. This is compared to each illumination element being controlled individually where they are not in unison, which can be very distracting.

It will also be appreciated that various combinations of colors or even multiple colors could be emitted from each component at the same time. According to a still further aspect, the controller 38 could be configured to emit different colors from each of the components at the same time. It will be appreciated that any sequence, order or placement of colors may be employed. According to an aspect, emitting different colors from the light sources in a controlled pattern is considered far more attractive then emitting the colors in a random fashion.

According to an aspect of the disclosure, the controller 38 could be configured to vary the pattern of colors utilized within the system at a predetermined time. For example, the controller 38 could be emitted to vary the pattern based on a time trigger, i.e., the pattern could change every hour. According to an aspect, the controller could be configured to change the pattern based on another event, such as the location of a vehicle. The controller could be configured to switch from one pattern to another based on a variety of different events or triggers. According to a further aspect, the controller 38 could be configured to switch from one controlled pattern to another pattern randomly.

In addition to colored patterns, the controller 38 could be configured to create other effects with the lights, including flashing the lights in a pattern. The lights could also be dimmed or have a variety of other effects.

Figure 11:
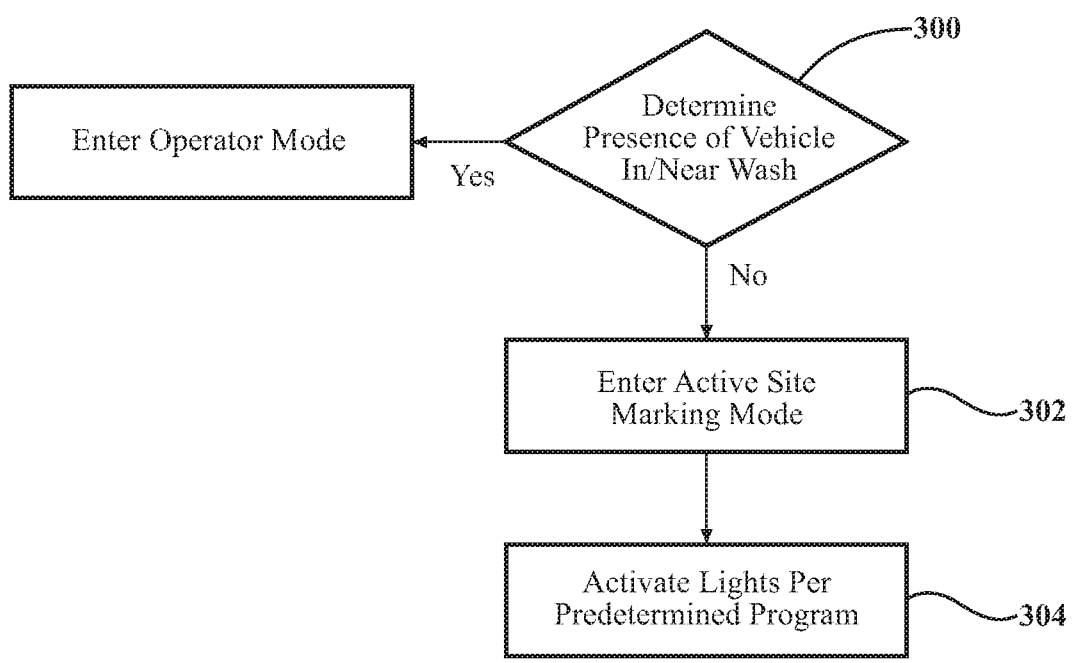
FIG. 11 is a schematic diagram illustrating a method of operating a vehicle wash system according to another aspect of the disclosure.

According to another aspect, the system may be configured to illuminate the lighting elements 156 associated with each of the dryer units 104 and/or within the facility upon other predetermined conditions being met or determined. For example, with reference to FIG. 11, the controller 38 may be in communication with various input sources, such as motion sensors or the like, to determine whether or not any vehicles are located in the vehicle treatment area 36 or may be approaching the vehicle treatment area, as generally indicated by reference number 300. It will be appreciated that the controller may receive inputs from a variety of different sources to assist with the determination of whether or not vehicles are in or approaching the vehicle treatment area. In the instance where no vehicles are located in the vehicle treatment area and/or approaching the vehicle treatment area, the controller 38 may place the system into an active site marketing mode, as generally indicated by reference number 302. In the active site marketing mode, the lights on the dryer assembly 100, as discussed above, may be signaled to illuminate in an effort to draw attention to the vehicle wash system and its services and thereby draw customers to the facilities. This active site marketing mode can be used to increase revenue for the facility. According to another aspect, the controller 38 could enable the active site marketing mode based on a variety of other inputs or ways, including time. According to another aspect, the controller 38 can be in communication with other effects that can be actuated when the active site marketing mode is enabled, such as music.

According to an aspect, in active site marketing mode, the controller 38 may utilize the lighting elements within the facility to put on a light show according to a preselected program, as generally indicated by reference number 304. According to one aspect, the controller 38 could be configured to cycle the lights on the various components between the various RGB colors available. For example, the controller 38 may be programmed such that in the active site marketing mode, it cycles between red, blue, green, yellow (red+green), purple (red+blue), cyan (green+blue) and white (red+green+blue). Alternatively, the controller 38 could be configured to cycle the lighting elements through less than all of these colors or in a variety of different patterns. It will also be appreciated that the controller 38 could be programmed to employ variations of these colors by changing the intensity of the primary colors, as will be appreciated by one of ordinary skill in the art to achieve an almost unlimited number of different colors. According to a further aspect, in the active site marketing mode, the controller 38 may be configured to have the lights blink, flash or employ a variety of different effects. It will further be appreciated that the effects may vary and that different components may have different effects as desired. It will also be appreciated that the active site marketing mode may have different profiles that can result in different light shows. For example, there can be a summer schedule, a winter schedule or a holiday schedule (i.e. Christmas or Halloween) that when enabled can display a light show tailored to that particular event or schedule. A variety of other schedules may also be employed including bearing colors for a local sports team or university on game day or other special event. It will also be appreciated that the controller 38 can be programmed to illuminate the lights in colors that are randomly determined.

According to a still further aspect and as discussed above, the controller 38 can be configured during the active site marketing mode to illuminate lights on the various components that make up the vehicle wash system while the components are rotating. This can serve to further draw attention to the vehicle wash facility and its services, including after hours. Alternatively, the lights may be illuminated while the components are at rest. It will also be appreciated in accordance with the disclosure herein, that lights may be employed in a variety of other locations in addition to or instead of on the components.

The active site marketing mode can serve to draw attention to the vehicle wash facility and advertise to the public, including passing vehicles, that the facility is a vehicle wash and provides wash services. According to another aspect, when a vehicle is sensed as arriving, the controller 38 may disable active site marketing mode and enable operator mode, as generally indicated by reference number 306, which allows an operator to select a vehicle wash package for a user. The controller can then display the lights on the dryer assembly 100 to a package confirmation mode, as discussed above. It will be appreciated that active site marketing can operate at all time and may operate independently of package confirmation or any other feature.

According to a further aspect, the controller 38 may be configured to enable active site marketing mode within a predetermined period of no vehicle being sensed at the vehicle wash. It will be appreciated that active site marketing mode can be enabled based on a variety of other inputs or criteria. For example, it may be manually triggered by an operator by toggling a switch. It can also be accomplished from a remote input, such as through a mobile device configured to communicate with the controller 38.

According to another aspect, the controller 38 may utilize the lights to communicate information about the wash system and its components to the operators, including diagnostic information. As is known, vehicle wash systems employ controllers that constantly monitor the system and its operation. To the extent something with the system is not operating as expected or requires attention, these controllers can generate a fault code. The fault code can be a critical one that requires the system to be shut down or a non-critical one that requires some attention on the part of the operator, but does not require the system to be shut down. Typically, vehicle wash systems employ humans at the front and back of the system and thus they are not able to see if there is anything irregular going on with the wash and/or generally do not have line of sight with the controller to see or hear any alarms that may be triggered by the controller in the event a fault is detected. As such, the controller typically generates a fault code and transmits this code to an operator so they may take action. However, operators may not always notice or respond to the message immediately, particularly if they are not at the facility or if the fault is of the non-critical type.

Figure 12:
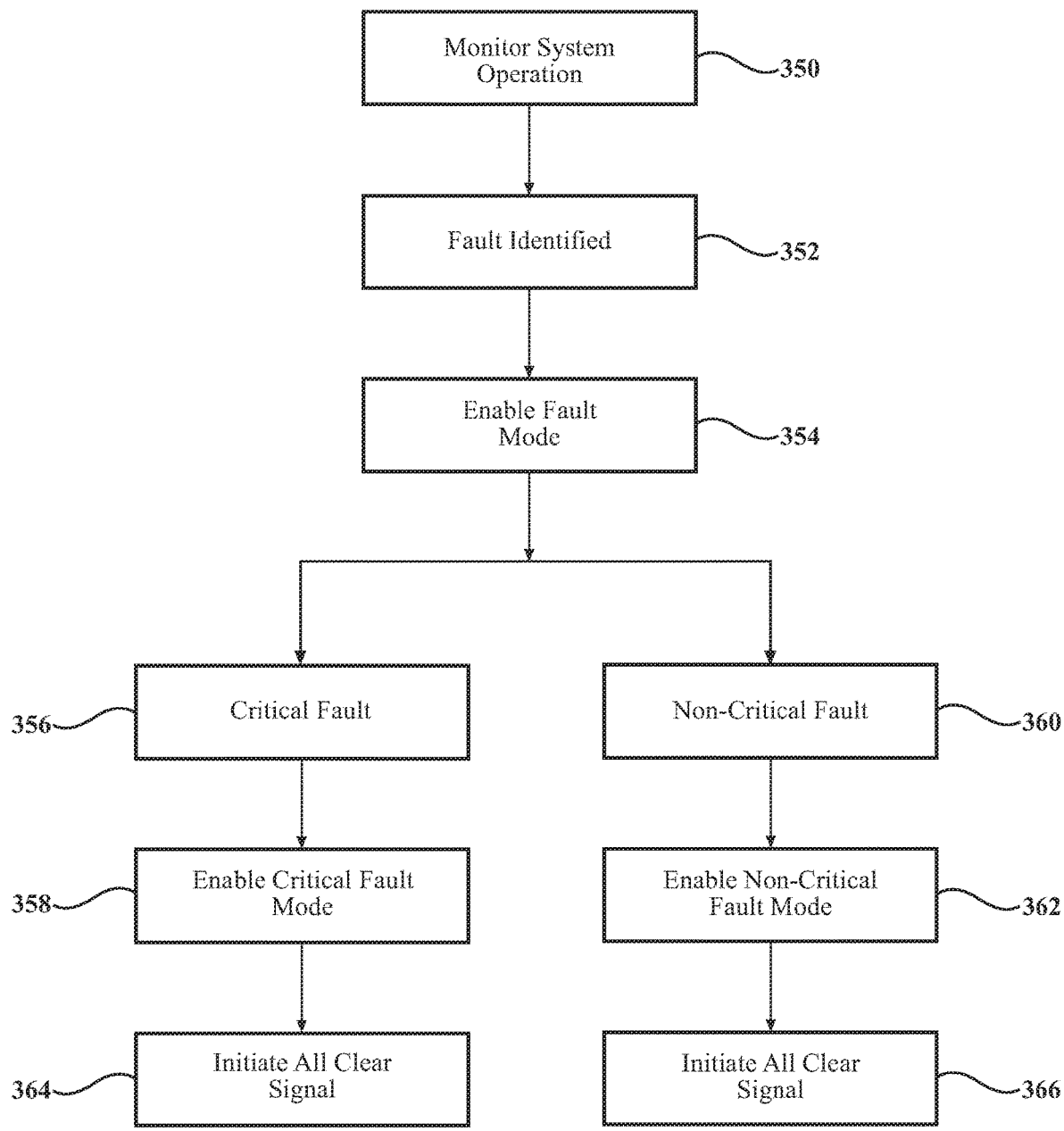
FIG. 12 is a schematic diagram illustrating a method of operating a vehicle wash system according to a further aspect of the disclosure.

According to this aspect of the disclosure and with reference to FIG. 12, the controller 38 may be in communication with various sensors and inputs in order to evaluate the operation of the system, as generally indicated by reference number 350. In the event the controller 38 identifies a fault, as generally indicated by reference number 352, it can be configured to enable a fault mode, as generally indicated by reference number 354.

According to a further aspect, in the fault mode, the controller 38 can be configured to illuminate lights within the vehicle wash facility, including the lights on the vehicle wash components to communicate information about the fault to operators. According to an exemplary aspect, if the fault is a critical fault requiring a system shut down or an emergency system shut down, as generally indicated by reference number 356, the controller 38 may be configured to illuminate the lights on the components "red", as generally indicated by reference number 358. The controller 38 may also be configured to have the lights flash or blink. In addition to illuminating the lights in a red color, the controller 38 can also be configured to shut the system down entirely to allow the fault to be addressed. The blinking red lights can alert the vehicle operator to attend to the fault. It will be appreciated that the controller 38 can also be configured to send specific fault information to the operator, such as by e-mail or text, so that the operator has specific information about the nature of the fault and can quickly resolve the fault or take other action as may be necessary. It will be appreciated that a variety of different sensed conditions can cause the controller 38 to trigger a critical fault, such as contact between a vehicle and a wash component. It will also be appreciated that the controller can be configured to illuminate lights in different colors for different critical faults or employ different lighting effects for different critical faults to convey more specific information to an operator regarding the fault based on the lighting elements alone. For example, one type of critical fault may cause the lights to flash red while another may cause the lights have a specific pattern of flashing red that will be recognizable to the wash operator.

In the event the controller 38 identifies a fault as a non-critical fault, as generally indicated by reference number 360, the controller 38 can then enable the non-critical fault mode, as generally indicated by reference number 362. According to an aspect, a non-critical fault may be one that is important and requires action, but does not require shut down of the system. An exemplary non-critical fault condition may be a determination that the supply of chemicals is low and requires refilling. In the event such a non-critical fault is determined, the controller 38 may be configured to cause the lights on the vehicle wash components to flash in a color yellow. Again, it will be appreciated that a variety of other conditions that are input into the controller 38 may cause it to enable the non-critical fault mode. It will further be appreciated that the color assigned to the lights and or the lighting effect may obviously vary for different non-critical fault conditions. Additionally, it will be appreciated that the fault mode may be a temporary condition that the controller implements on some lights or some components. The fault mode may supplement or supplant the operating mode, including the package confirmation mode, discussed above.

According to still another aspect, once the controller 38 senses that a fault condition no longer exists, it can be configured to emit an all clear signal, as generally indicated by reference number 364. This can be accomplished by flashing the lights in the system green. According to an example, when the controller 38 senses that two vehicles being treated by the system may be in too close of proximity to one another, the controller can enable the non-critical fault mode. Under this example, lights associated with some or all of the various system components may be configured to blink a color, such as blue. They may remain blinking this color until the controller senses that the fault condition has been rectified. In that event, the controller 38 may then emit the all clear signal and flash the lights that were blinking blue a green color.

According to an aspect, the utilization of the controller in this fashion can allow the car wash to be self-monitoring and also perform self-diagnostics. The controller can then communicate the information it has sensed or determined from the various inputs it monitors to wash operators and employees by coloring the lights with specific colors and effects that have been pre-assigned to be associated with certain fault conditions. This can allow the operators and employees to take any necessary action that may be required as a result of the fault condition in a prompt manner to minimize any down time of the system.

Figure 13:
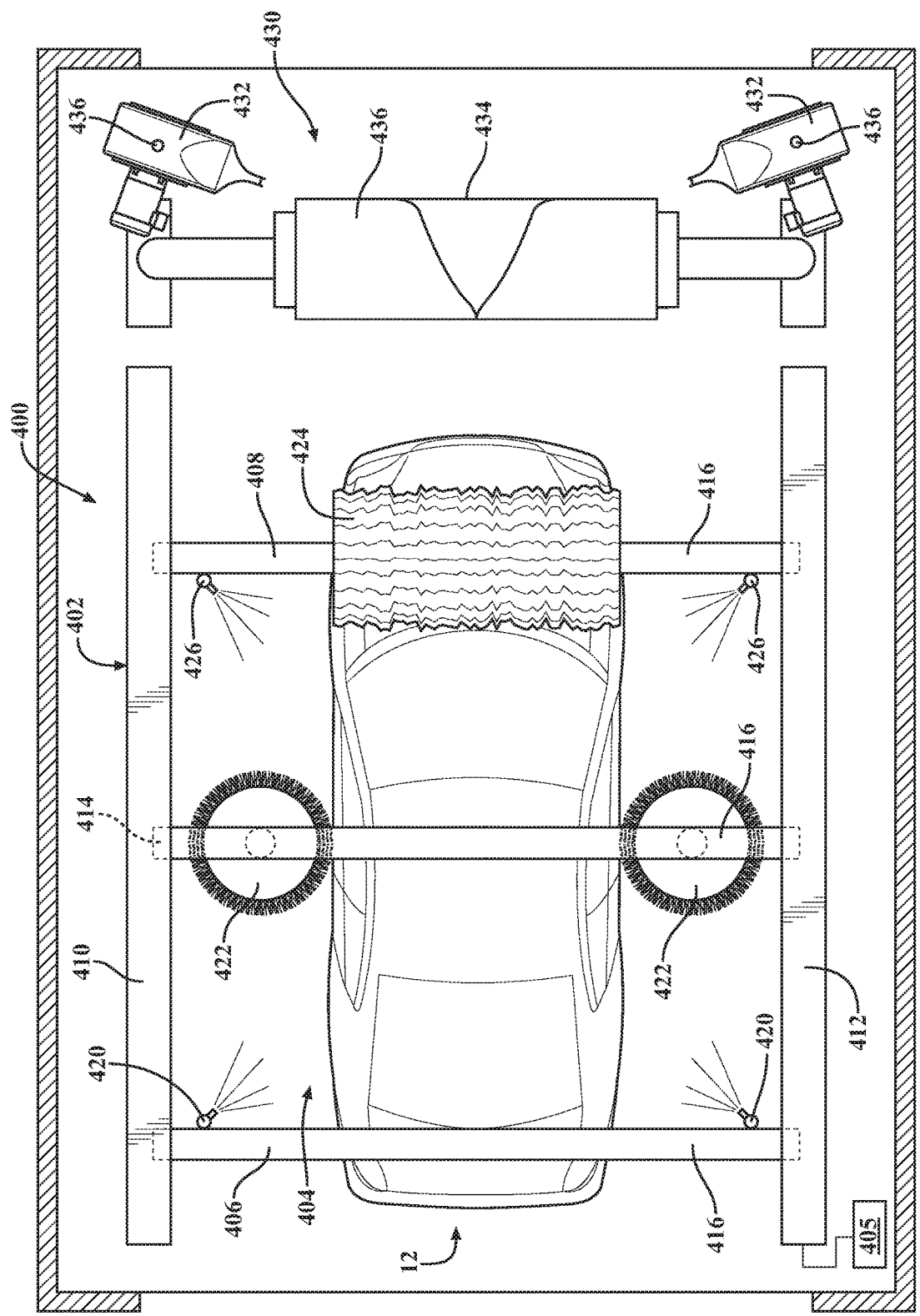
FIG. 13 is a schematic illustration of a vehicle wash system according to another aspect of the disclosure.

According to a still further aspect, the vehicle wash system 400 could be configured as an in-bay or rollover wash system where the vehicle remains stationary while the wash components translate or move with respect to the vehicle 12. With reference to FIG. 13, an exemplary wash system is provided.

According to an aspect, the wash system 400 can include a frame structure 402 that is disposed adjacent a vehicle treatment area 404. According to an aspect, the frame structure 402 can consist of a single gantry or multiple gantries that move under direction of a controller 405 on parallel overhead rails. According to an aspect, an exemplary system can include an entry gantry 406 and an exit gantry 408 that are supported on and move with respect to the vehicle treatment area on overhead rails 410, 412. The system can also include a center gantry 414. Each gantry can include a pair of upstanding legs that extend from the floor surface and are connected at their upper ends by an upper cross-piece member 416.

As will be appreciated, the entry gantry 406 can include a plurality of side brushes 418 for engaging side exterior surfaces of the vehicle 12. The entry gantry 406 can also have a plurality of spray nozzles 420 for spraying water or chemical onto the exterior surface of the vehicle. According to another aspect, the exit gantry 408 can also include a plurality of side brushes 422 for engaging side exterior surfaces of the vehicle. The exit gantry 408 can also include a top brush 424 for engaging an upper exterior surface of the vehicle. The exit gantry can also include a plurality of spray nozzles 426. It will be appreciated that more or different wash or treatment components can be disposed on one or both gantries.

As will be understood, once a vehicle enters and stops in the vehicle treatment area 404, the controller can direct movement of the gantries to wash and clean the exterior vehicle surface. Upon completion of this process, the vehicle can be directed to move forward to a dryer assembly 430. The dryer assembly 430 may be stationary or may be configured to move with respect to the vehicle. According to a still further aspect, the dryer assembly 430 may be incorporated onto the frame structure 402.

According to an aspect, the dryer assembly 430 can include a pair of side dryer units 432 and an overhead blower assembly 434. Each of the side dryer units 432 and the overhead blower assembly 434 can be formed of a translucent material and can have one or more illumination sources 436 disposed therein or otherwise associated therewith. The dryer assembly 430 and the associated illumination sources 436 may be in communication with the controller 405 such that the light sources 436 may be enabled to convey information to the vehicle owner or the vehicle wash operator. For example, the light sources 436 may be enabled in a color corresponding to the wash package selected by the vehicle owner. Alternatively, the light sources 436 may be enabled to emit light in a predetermined program of colors when no vehicles are present in the vehicle treatment area 404. It will also be appreciated that the light sources 436 can have a variety of different modes to convey information, such as diagnostic information about the system of navigational information.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A vehicle treatment system, comprising:
   at least one dryer element disposed adjacent an exit end of the vehicle treatment system, the at least one dryer element having an inlet, a housing, and at least one outlet for emitting high velocity air onto an exterior surface of a vehicle;
   at least one light source associated with the dryer element, the at least one light source having a plurality of modes with each of the plurality of modes associated with at least one of a plurality of different system states;
   a controller in communication with the at least one light source and configured to receive data representative of a detected system state, the controller further configured to activate one of the plurality of modes in response to the detected system state;
   wherein, in at least one of the plurality of modes, the controller is configured to direct the at least one light source to emit light in a predetermined color;
   an enclosure of translucent material disposed within an interior of the housing for holding the at least one light source and for isolating the at least one light source from the high velocity air;
   wherein the housing is constructed of a translucent material;
   wherein the at least one light source is disposed within an interior of the enclosure and is configured to emit light through the housing when at least one of the plurality of modes is enabled; and
   the housing extending between a lower surface that is proximate to a floor surface of the vehicle treatment system and an upper surface that is spaced away from the floor surface, the upper surface extending parallel or at an oblique angle to the floor surface, the upper surface defining a clearance opening configured to receive the enclosure of translucent material into the interior of the housing.

2. The vehicle treatment system of claim 1, wherein the housing, the inlet and the at least one outlet of the at least one dryer element are part of an integral structure.

3. The vehicle treatment system of claim 1, wherein the at least one light source consists of an LED array.

4. The vehicle treatment system of claim 1, further comprising:
   a system state detector configured to determine a system state in effect and further configured to communicate data representative of the detected system state to the controller for enabling of a corresponding mode of the at least one light source.

5. The vehicle treatment system of claim 4, wherein the system state detector is an input device and the detected system state is a user selection input into the input device of one vehicle wash package from among a plurality of vehicle wash packages with each of the plurality of vehicle wash packages associated with different groups of vehicle services; and
   wherein the predetermined color is one of a plurality of different colors; and
   wherein each of the vehicle wash packages is associated with a corresponding one of the plurality of different colors.

6. The vehicle treatment system of claim 4, wherein the system state detector includes one or more motion sensors configured to detect a presence of one or more vehicles in a vehicle treatment area and wherein the detected system state is an absence of any vehicles present in the vehicle treatment system;
   wherein, in response to data received which is representative of the absence of any vehicles being present in the vehicle wash system, the controller is configured to enable a marketing mode.

7. The vehicle treatment system of claim 6, wherein in the marketing mode, the at least one light source is configured to emit light in a predetermined program of colors.

8. The vehicle treatment system of claim 1, wherein each of the plurality of modes corresponds to one of a plurality of vehicle wash packages;
   wherein the predetermined color is one of a plurality of different colors; and
   wherein the detected system state includes a user selected vehicle wash package;
   wherein the controller, in response to the data received representative of the user selected vehicle wash package, is configured to enable the associated mode of the at least one light source such that light with one of the plurality of different colors associated with the user selected vehicle wash package is emitted therefrom.

9. The vehicle treatment system of claim 1, wherein the detected system state is a system fault and wherein, in response to data received which is representative of a detected system fault, the controller is configured to enable a mode of the at least one light source that corresponds to the detected system fault.

10. The vehicle treatment system of claim 9, wherein the system fault has an associated fault type with an associated color and wherein the mode corresponding to the detected system fault results in the at least one light source emitting light in the color associated with the fault type of the detected system fault.

11. The vehicle treatment system of claim 1, wherein the vehicle treatment system is an in-bay system.

12. A vehicle treatment system comprising:
a dryer element disposed on a frame adjacent an exit end of the system, the dryer element having an air inlet, a plurality of air outlets, and a housing constructed of a translucent material;
at least one light source disposed to illuminate the housing and configured to emit light in a plurality of different colors, the at least one light source having a plurality of modes each corresponding to a different system condition; and
a controller in communication with the at least one light source and configured to enable a distinct one of the plurality of modes in response to a detected system condition;
an enclosure of translucent material disposed within an interior of the housing for holding the at least one light source and for isolating the at least one light source from the high velocity air;
wherein the at least one light source is suspended in the enclosure to allow light from the at least one light source to be transmitted through the housing about 360 degrees around the housing; and
the housing extending between a lower surface that is proximate to a floor surface of the vehicle treatment system and an upper surface that is spaced away from the floor surface, the upper surface extending parallel or at an oblique angle to the floor surface, the upper surface defining a clearance opening configured to receive the enclosure of translucent material into the interior of the housing.

13. The vehicle treatment system of claim 12, wherein the detected system condition corresponds to a wash package selection received from a user, wherein the wash package selection corresponds to a unique set of wash components for engaging a user's vehicle as part of a vehicle wash process; and
wherein the controller is configured to enable a package confirmation mode of the at least one light source in response to the received wash package selection.

14. The vehicle treatment system of claim 13, wherein the selected wash package is one of a plurality of different wash packages from which the user could select with each of the plurality of different wash packages having an associated color identifier; and
wherein, in the package confirmation mode, the controller is configured to direct the at least one light source to emit light in a color corresponding to the associated color identifier of the selected wash package.

15. The vehicle treatment system of claim 12, wherein the at least one light source is disposed in the housing and configured to emit light through the housing when each of the plurality of modes is enabled.

16. The vehicle treatment system of claim 12, further comprising:
a sensor configured to determine a presence of one or more vehicles in a vehicle treatment area, wherein the detected system condition corresponds to an absence of any vehicles in the vehicle treatment area; and
wherein the controller is configured to enable a marketing mode in response to the detected system condition corresponding to the absence of any vehicles in the vehicle treatment area whereby the at least one light source is configured to emit light in a predetermined pattern of colors.

17. The vehicle treatment system of claim 12, wherein the system condition corresponds with a detected diagnostic condition of the system; and
wherein the controller is configured to enable a diagnostic information mode and direct the at least one light source to emit light in a color that corresponds with the detected diagnostic condition of the system.

18. The vehicle treatment system of claim 12, wherein system is configured as a rollover wash system.

19. A vehicle treatment system comprising:
at least one dryer element having a housing and at least one outlet for emitting high velocity air onto an exterior surface of a vehicle;
the housing constructed of a translucent material and defining an air inlet, and the at least one outlet, the housing including a body portion configured to convey high velocity air from the air inlet to the at least one outlet;
at least one light source disposed within the body portion to illuminate the housing and configured to emit light in a plurality of different colors;
an enclosure of translucent material disposed within an interior of the housing for holding the at least one light source and for isolating the at least one light source from the high velocity air; and
the body portion of the housing extending between a lower surface that is proximate to a floor surface of the vehicle treatment system and an upper surface that is spaced away from the floor surface, the upper surface extending parallel or at an oblique angle to the floor surface, the upper surface defining a clearance opening configured to receive the enclosure of translucent material into the interior of the housing.

20. The vehicle treatment system of claim 19, wherein the housing includes an upper head portion configured to receive a motor unit; and
wherein the upper surface of the body portion is adjacent the upper head portion.

* * * * *